US011178266B2

(12) United States Patent
Britt et al.

(10) Patent No.: US 11,178,266 B2
(45) Date of Patent: *Nov. 16, 2021

(54) PHONE CASE

(71) Applicant: SecureGrip, LLC, Charlotte, NC (US)

(72) Inventors: David Wayne Britt, Charlotte, NC (US); Deborah Laun, Skaneateles, NY (US); Robert Naas, Skaneateles, NY (US)

(73) Assignee: SECUREGRIP, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/777,440

(22) Filed: Jan. 30, 2020

(65) Prior Publication Data

US 2020/0169626 A1 May 28, 2020

Related U.S. Application Data

(63) Continuation of application No. 15/872,861, filed on Jan. 16, 2018, now Pat. No. 10,554,798, which is a
(Continued)

(51) Int. Cl.
*H04M 1/02* (2006.01)
*H04B 1/3888* (2015.01)
(Continued)

(52) U.S. Cl.
CPC .......... *H04M 1/0281* (2013.01); *H04B 1/385* (2013.01); *H04B 1/3888* (2013.01);
(Continued)

(58) Field of Classification Search
CPC ........ H04M 1/0281; H04M 1/04; H04M 1/18; H04M 1/6041; H04M 1/0214;
(Continued)

(56) References Cited

U.S. PATENT DOCUMENTS 3,572,870 A 3/1971 Marks
5,477,870 A * 12/1995 Menaged ................. A45D 8/24
132/278
(Continued)

FOREIGN PATENT DOCUMENTS

GB 2515397 9/2015
JP 3430078 5/2003
(Continued)

OTHER PUBLICATIONS

CES 2015: Beeline shows off iPhone 6 case w/retractable kevlar cord for the outdoors, 49 Magazine, 2015, retrieved from www.49magazine.com/archives/10749, 3 pgs. 2015.
(Continued)

*Primary Examiner* — Yuwen Pan
*Assistant Examiner* — Paul P Tran
(74) *Attorney, Agent, or Firm* — Bryan Cave Leighton Paisner LLP (57) ABSTRACT

A phone case includes a back and sides extending downward from the back, such that the sides and the back define a phone-receiving recess configured to receive and secure a phone therein. The phone case further includes a finger-hold attached to the back and having a top member and a bottom member. The finger-hold is movable between an extended position in which an opening is defined between the top member and the bottom member for use in gripping the phone case and a collapsed position in which the top member is substantially flat against the bottom member. The finger-hold can be biased to the extended position. The finger-hold can be rotatably attached to the back.

14 Claims, 11 Drawing Sheets

Related U.S. Application Data continuation of application No. 29/625,022, filed on Nov. 6, 2017.

(51) Int. Cl.

| | | |
|---|---|---|
| *H04M 1/60* | (2006.01) | |
| *H04B 1/3827* | (2015.01) | |
| *H04M 1/18* | (2006.01) | |
| *H04M 1/04* | (2006.01) | |
| *A45F 5/10* | (2006.01) | |
| *A45F 5/00* | (2006.01) | |

(52) U.S. Cl.
CPC ............... *H04M 1/04* (2013.01); *H04M 1/18* (2013.01); *H04M 1/6041* (2013.01); *A45F 5/10* (2013.01); *A45F 2005/008* (2013.01); *A45F 2200/0516* (2013.01)

(58) Field of Classification Search
CPC .. H04M 1/0206; H04M 1/0283; H04M 1/185; H04B 1/385; H04B 1/3888; H04B 1/3877; A45F 5/10; A45F 2005/008; A45F 2200/0516; A45F 5/00; A44C 9/0061; A45C 11/00; A45C 13/26; G06F 1/1626; G06F 1/163; G06F 1/1656; G06F 1/1658; G06F 1/166; H05K 5/0004; H05K 5/02; H05K 5/0204; H05K 5/0226; H05K 5/0234; H05K 5/03; H05K 7/00
See application file for complete search history.

(56) References Cited

U.S. PATENT DOCUMENTS

| | | | |
|---|---|---|---|
| 5,938,137 A | 7/1999 | Poulson | |
| 6,257,251 B1 * | 7/2001 | Burleson | A45D 8/24 132/279 |
| 6,546,103 B1 | 4/2003 | Wong | |
| 7,661,567 B2 | 2/2010 | Myers | |
| 7,665,684 B2 | 2/2010 | Salentine et al. | |
| 8,251,210 B2 | 8/2012 | Schmidt et al. | |
| 8,297,440 B2 | 10/2012 | Schmidt et al. | |
| D675,197 S | 1/2013 | Losiewicz | |
| 8,371,486 B2 | 2/2013 | Imafuku et al. | |
| D679,271 S | 4/2013 | Liu | |
| 8,408,513 B2 | 4/2013 | Smith | |
| 8,411,849 B1 | 4/2013 | McKenzie et al. | |
| D685,778 S | 7/2013 | Fahrendorff et al. | |
| D686,199 S | 7/2013 | Fahrendorff et al. | |
| 8,528,798 B2 | 9/2013 | Chen | |
| 8,550,317 B2 | 10/2013 | Hyseni | |
| 8,567,832 B2 | 10/2013 | Kannaka | |
| 8,577,412 B1 | 11/2013 | Bishop | |
| 8,678,255 B2 | 3/2014 | Zhang et al. | |
| D703,647 S | 4/2014 | Kim | |
| 8,737,066 B1 | 5/2014 | Block | |
| D706,254 S | 6/2014 | Chang | |
| 8,746,448 B1 | 6/2014 | Bellace | |
| 8,794,560 B2 | 8/2014 | Salentine et al. | |
| 8,915,409 B2 | 12/2014 | Smith | |
| 9,072,363 B2 | 7/2015 | Paugh et al. | |
| 9,104,377 B2 | 8/2015 | Rekuc et al. | |
| 8,950,638 B2 | 10/2015 | Wangereyn et al. | |
| 9,155,377 B2 | 10/2015 | Wangereyn et al. | |
| 9,179,762 B2 | 11/2015 | Paugh | |
| 9,210,977 B2 | 12/2015 | Lach et al. | |
| 9,261,912 B2 | 2/2016 | Bell | |
| 9,300,346 B2 | 3/2016 | Hirsh | |
| 9,312,905 B2 | 4/2016 | Ehrlich | |
| D756,980 S | 5/2016 | Beeman | |
| 9,369,168 B2 | 6/2016 | Molnar | |
| 9,386,832 B2 | 7/2016 | Elgan | |
| D763,239 S | 8/2016 | Chan et al. | |
| D765,069 S | 8/2016 | Jeffrey | |
| 9,407,743 B1 | 8/2016 | Hershberg | |
| D766,225 S | 9/2016 | Williams | |
| 9,469,499 B1 | 10/2016 | Chen | |
| 9,473,608 B1 | 10/2016 | Sherman et al. | |
| D771,028 S | 11/2016 | Kim | |
| D771,608 S | 11/2016 | Kim et al. | |
| 9,496,911 B2 | 11/2016 | Brand | |
| D774,500 S | 12/2016 | Reese | |
| 9,521,896 B2 | 12/2016 | Peterson | |
| D775,619 S | 1/2017 | Tien | |
| D776,104 S | 1/2017 | Tien | |
| D777,154 S | 1/2017 | McGowan et al. | |
| 9,538,833 B2 | 1/2017 | Rowley | |
| 9,545,146 B1 | 1/2017 | King | |
| 9,545,147 B2 | 1/2017 | King | |
| D778,275 S | 2/2017 | Gabriel et al. | |
| D780,166 S | 2/2017 | Gabriel et al. | |
| D780,167 S | 2/2017 | Tien | |
| 9,581,291 B2 | 2/2017 | Trotsky | |
| 9,590,685 B1 | 3/2017 | Yehuda | |
| 2005/0011982 A1 | 1/2005 | Salentine et al. | |
| 2005/0072819 A1 | 4/2005 | Maldonado et al. | |
| 2007/0278265 A1 | 12/2007 | Contente | |
| 2008/0227419 A1 | 9/2008 | Traub | |
| 2011/0084081 A1 | 4/2011 | Chung | |
| 2011/0266316 A1 | 11/2011 | Ghalib | |
| 2011/0267748 A1 | 11/2011 | Lane et al. | |
| 2011/0297581 A1 | 12/2011 | Angel | |
| 2011/0309117 A1 | 12/2011 | Roberts | |
| 2012/0025039 A1 | 2/2012 | Segal | |
| 2012/0025684 A1 | 2/2012 | Trotsky | |
| 2012/0031937 A1 | 2/2012 | Baker | |
| 2012/0043452 A1 | 2/2012 | Karmatz | |
| 2012/0048873 A1 | 3/2012 | Hyseni | |
| 2012/0063066 A1 | 3/2012 | Floit | |
| 2012/0111881 A1 | 5/2012 | Gaddis | |
| 2012/0113572 A1 | 5/2012 | Gaddis | |
| 2012/0187706 A1 | 7/2012 | Kannaka | |
| 2012/0267402 A1 | 10/2012 | Beatty | |
| 2012/0299318 A1 | 11/2012 | Murphy | |
| 2013/0214022 A1 | 8/2013 | Harvey | |
| 2013/0240380 A1 | 9/2013 | Hansen | |
| 2013/0240580 A1 | 9/2013 | Yu | |
| 2014/0117177 A1 | 5/2014 | Shamsadov | |
| 2014/0148313 A1 | 5/2014 | Orlando | |
| 2014/0152034 A1 | 6/2014 | Tussy | |
| 2014/0217135 A1 | 8/2014 | Murphy | |
| 2014/0364176 A1 | 12/2014 | Pintor | |
| 2015/0076183 A1 | 3/2015 | Palma | |
| 2015/0097008 A1 | 4/2015 | Adeyemi | |
| 2015/0122852 A1 | 5/2015 | Feng | |
| 2015/0157116 A1 | 6/2015 | Williams | |
| 2015/0201743 A1 | 7/2015 | Erickson-Davis et al. | |
| 2015/0289634 A1 | 10/2015 | Chavez | |
| 2015/0305480 A1 | 10/2015 | Brousseau | |
| 2015/0331448 A1 | 11/2015 | Truong et al. | |
| 2015/0335138 A1 | 11/2015 | Juarbe | |
| 2016/0028428 A1 * | 1/2016 | Sturniolo | A45C 11/00 455/575.8 |
| 2016/0088924 A1 * | 3/2016 | Haymond | A45F 5/00 224/218 |
| 2016/0094262 A1 | 3/2016 | Chroney | |
| 2016/0249718 A1 | 9/2016 | Oh et al. | |
| 2016/0323007 A1 * | 11/2016 | Halpern | H04B 1/3888 |
| 2016/0345715 A1 | 12/2016 | Lin | |
| 2016/0353867 A1 * | 12/2016 | Due | A45F 5/00 |
| 2017/0000250 A1 * | 1/2017 | Carnevali | A45F 5/10 |
| 2017/0055660 A1 | 3/2017 | Tien | |
| 2017/0104854 A1 | 4/2017 | Park | |
| 2017/0135234 A1 | 5/2017 | Kim | |
| 2018/0220782 A1 | 8/2018 | Mody | |
| 2018/0302114 A1 | 10/2018 | Nielsen | |
| 2019/0141174 A1 | 5/2019 | Britt | |

FOREIGN PATENT DOCUMENTS

| | | |
|---|---|---|
| JP | 2013165823 | 8/2013 |
| JP | 2014023141 | 2/2014 |
| KR | 101765766 | 8/2017 |

(56) References Cited

FOREIGN PATENT DOCUMENTS

| WO | 2016019256 | 2/2016 |
|----|------------|--------|
| WO | 2016081362 | 5/2016 |
| WO | 2016166607 | 10/2016 |

OTHER PUBLICATIONS

Foldable selfie stick case for iPhone 7 retractable PC Silicone Mobile Phone Bluetooth Remote Control Coque for iPhone 7plus, retrieved Mar. 10, 2017 from www.pinterest.com/pin/67525853784854239/, 3 pgs. 2017.
Case iPhone Retractable Selfie Stick Apple iPhone 6, iPhone 6 Plus, iPhone 6s, iPhone 6s Plus, retrieved Mar. 10, 2017 from www.casefanatic.com/store/ 2017.
Patent Cooperation Treaty, International Search Report for PCT/US2019/013793, 3pgs, dated Apr. 23, 2019.
Discount Retractable Covers, 2017 Retractable Car Covers on sale at DHgate, retrieved from www.dhgate.com/discount/retractable-covers-on-sale.html 2017.
Chua, M., Reelcase—IPhone case with retractable lanyard marks sure your phone is always by your side, retrieved from mikeshouts.com/reelcase-iphone-case-with-retractable-lanyard/ 2015.
Patent Cooperation Treaty, International Search Report for PCT/US2019/022751, 3 pages dated Jun. 28, 2019.

\* cited by examiner

PHONE CASE

RELATED APPLICATION

This application is a continuation of U.S. application Ser. No. 15/872,861, filed Jan. 16, 2018 which claims priority to U.S. application Ser. No. 29/625,022, filed Nov. 6, 2017, the entirety of which is hereby incorporated by reference.

FIELD

The present disclosure generally relates to phone cases, and more particularly to apparatuses and methods related to phone cases having a finger-hold.

BACKGROUND

Mobile phones and handheld devices are in widespread use. The devices are often expensive, leading users to purchase protective phone cases to prevent damage to the phones from dropping or everyday use. It can be difficult for users to maintain their grip on the phone during activities such as texting, browsing, and taking pictures or selfies. Furthermore, phones and the phone screens can be utilized in different orientations, depending on the desired use and the preferences of the user.

SUMMARY

Among the various aspects of the present disclosure is the provision of a phone case having a finger-hold as substantially shown and described.

Briefly, therefore, one aspect of the disclosure is directed to a phone case comprising a back and sides extending downward from the back, such that the sides and the back define a phone-receiving recess configured to receive and secure a phone therein. A finger-hold is attached to the back and has a top member and a bottom member. The finger-hold is movable between an extended position in which an opening is defined between the top member and the bottom member for use in gripping the phone case and a collapsed position in which the top member is substantially flat against the bottom member.

Another aspect of the disclosure is directed to a phone case comprising a back including a recessed portion having a base. The back further includes at least one overhang overlying part of the base of the recessed portion. Sides extend downward from the back, such that the sides and the back define a phone-receiving recess configured to receive and secure a phone therein. A finger-hold is attached to the base of the recessed portion and has a top member and a bottom member. The finger-hold is movable between an extended position in which an opening is defined between the top member and the bottom member for use in gripping the phone case and a collapsed position in which the top member is substantially flat against the bottom member. The finger-hold is biased to the extended position.

Another aspect of the disclosure is directed to a method comprising providing a phone case. The phone case has a back including a recessed portion having a base. The back further includes at least one overhang overlying part of the base of the recessed portion. Sides extend downward from the back, such that the sides and the back define a phone-receiving recess configured to receive and secure a phone therein. A finger-hold is rotatably attached to the base of the recessed portion and has a top member and a bottom member. The finger-hold is movable between an extended position, in which an opening is defined between the top member and the bottom member for use in gripping the phone case, and a collapsed position in which the top member is substantially flat against the bottom member. The finger-hold is biased to the extended position. The method includes collapsing the finger-hold from the extended position to the collapsed position by pressing the top member substantially flat against the bottom member and rotating the finger-hold until at least one tab of the bottom member is positioned between the base of the recessed portion and the at least one overhang.

Other objects and features will be in part apparent and in part pointed out hereinafter.

BRIEF DESCRIPTION OF THE DRAWINGS

These and other features, aspects and advantages of the disclosure will become more fully apparent from the following detailed description, appended claims, and accompanying drawings, wherein the drawings illustrate features in accordance with exemplary aspects of the disclosure, and wherein:

Like reference numerals indicate corresponding parts throughout the several views of the drawings.

DETAILED DESCRIPTION

The accompanying Figures and this description depict and describe aspects of apparatuses and methods in accordance with the present disclosure, and features and components thereof. It should also be noted that any references herein to front and back, right and left, top and bottom and upper and lower and the like are intended for convenience of description, not to limit the present invention or its components to any one positional or spatial orientation.

Before any aspects of the disclosure are explained in detail, it will be understood that the disclosure is not limited in its application to the details of construction and the arrangement of components set forth in the following description or illustrated in the following drawings. The disclosure is capable of other aspects and of being practiced or of being carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. All numbers expressing measurements and so forth used in the specification and claims are to be understood as being modified in all instances by the term "about."

Figure 1:
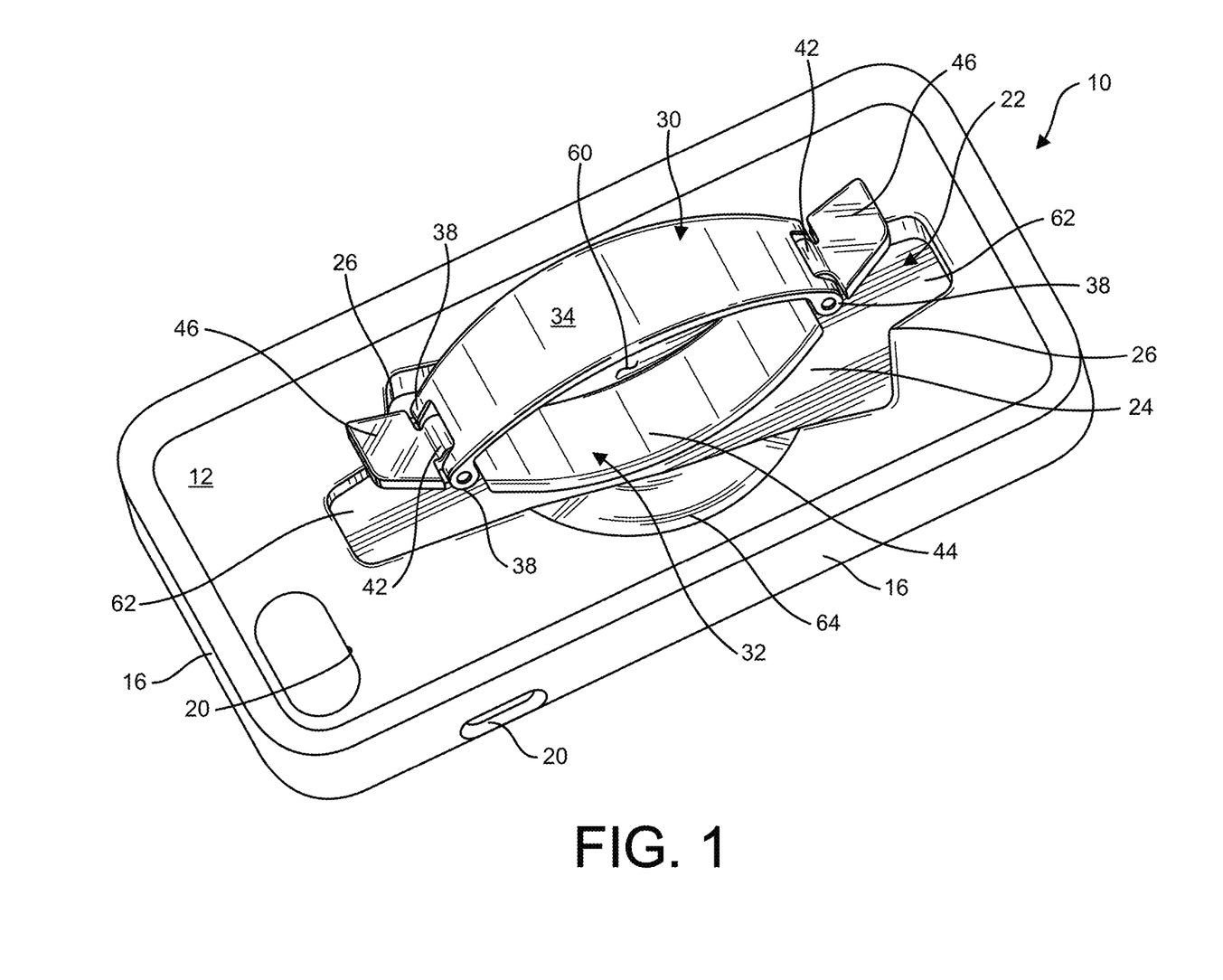
FIG. 1 is a perspective view of a phone case illustrating a finger-hold in a first extended position.
Figure 2:
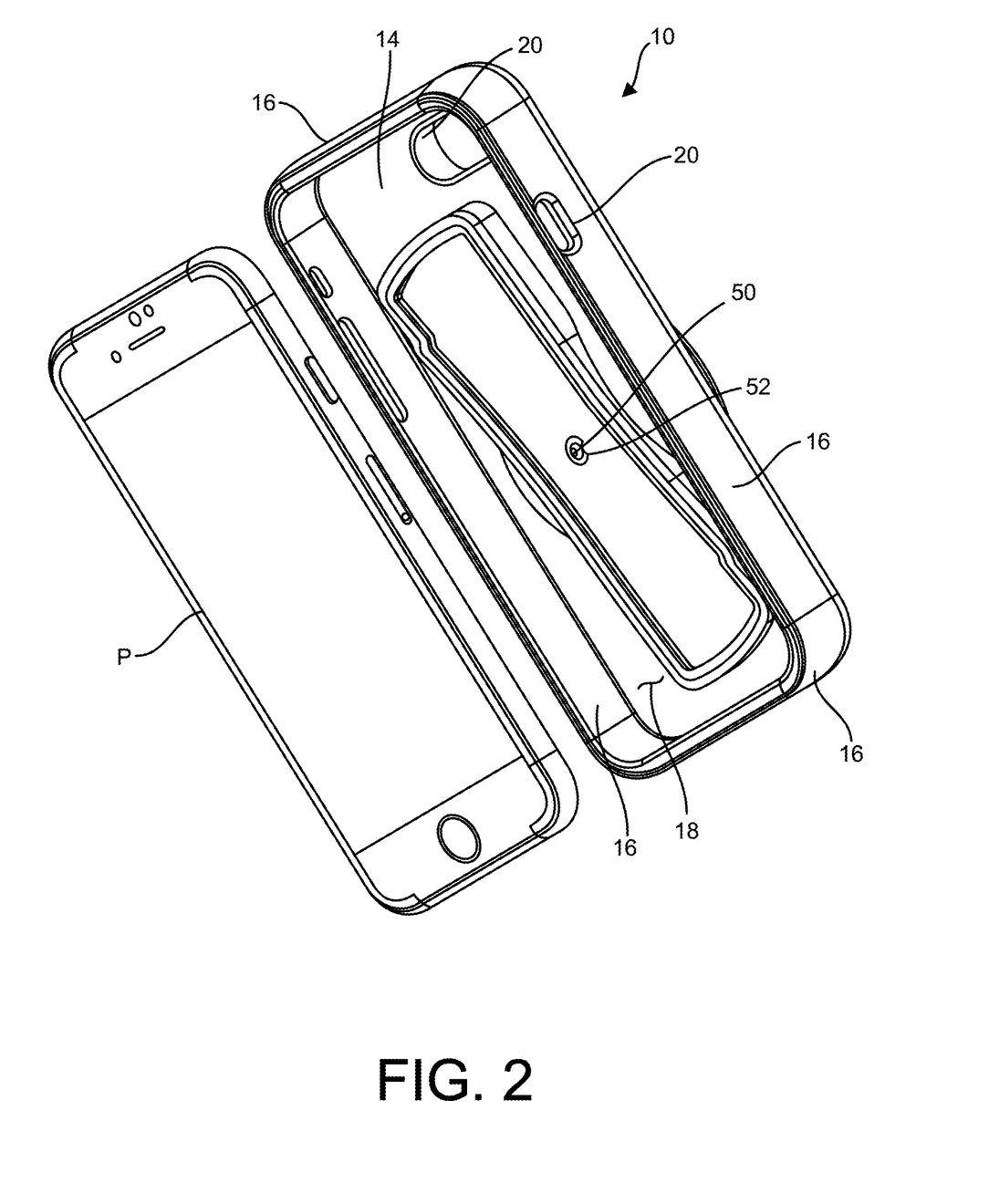
FIG. 2 is a separated perspective view of the phone case of FIG. 1 and a phone for receipt therein.
Figure 3:
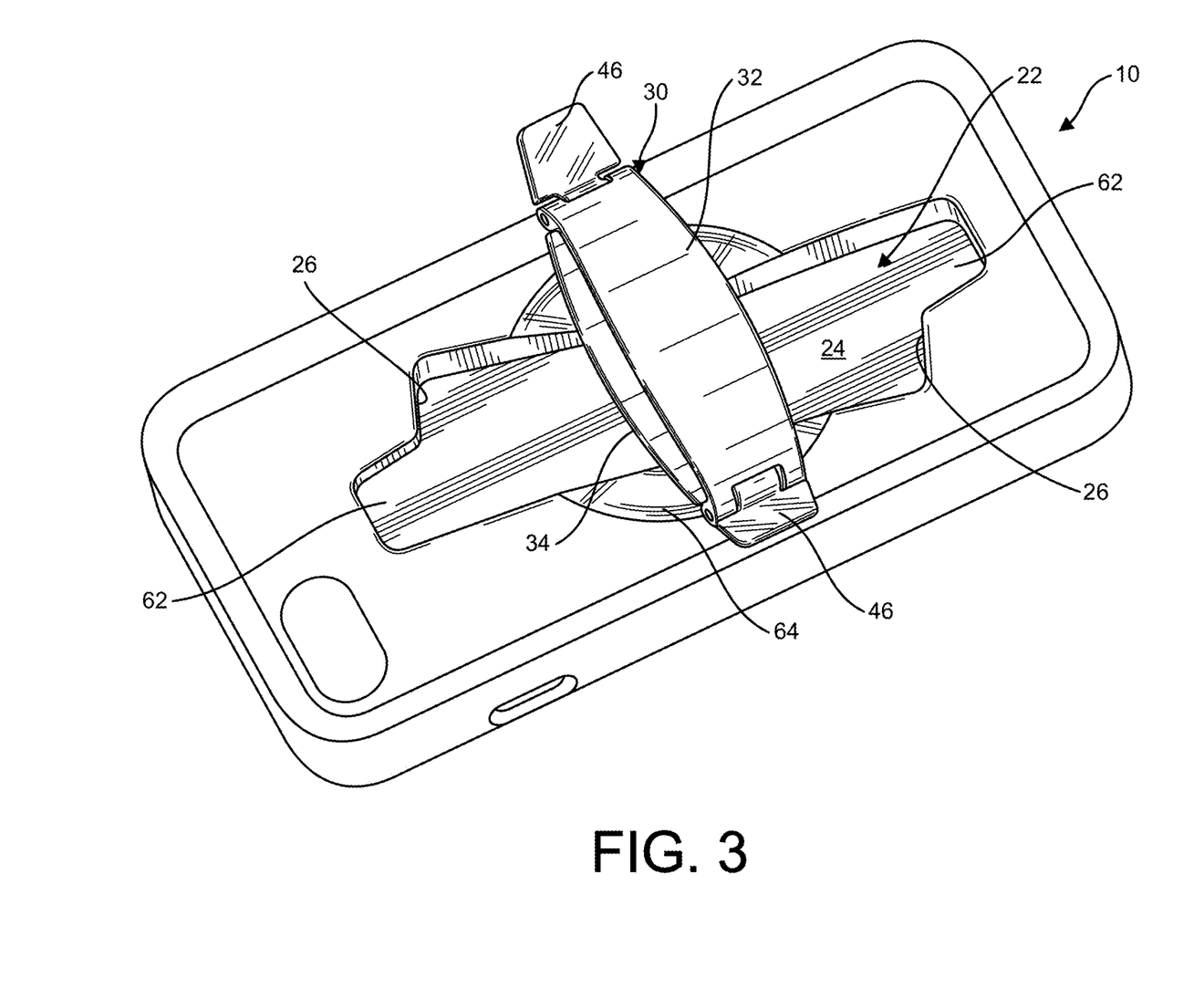
FIG. 3 is a perspective view of the phone case of FIG. 1, illustrating the finger-hold in a second extended position rotated from the first extended position.

Referring to FIGS. 1-3, a phone case is shown generally at 10. The phone case 10 includes a back having an outer surface 12, an inner surface 14 opposite the outer surface, and sides 16 extending downward from each edge of the back. The phone case 10 is generally rectangular, although other configurations are within the scope of the present invention. As seen in FIG. 2, the sides 16 extend forward of the inner surface 14, such that the sides and the inner surface of the back define a phone-receiving recess 18. The phone case 10 can be configured to receive any phone or handheld device P (e.g., phones and handheld devices sold by Apple, Inc., Samsung Group and Samsung Electronics, Google LLC, etc.) in order to protect the phone from drops, scratches, and everyday use. As such, the back and sides may include various openings and/or demarcations 20 corresponding to the configuration of the phone that will be received in the case 10 (e.g., camera opening, speaker opening, volume button openings or demarcations, etc.). For example, in one embodiment the phone case 10 can be configured to receive and protect an IPHONE made by Apple, Inc. The phone can snap into the case 10 or otherwise be securely received in the case, as is known in the art. The phone case 10 can be made of any suitable plastic, rubber, metal, or any other material suitable for use in protecting a phone, as is known in the art. The phone case 10 may be molded or formed as one piece, or may be constructed of separate components that are attached together.

Figure 4:
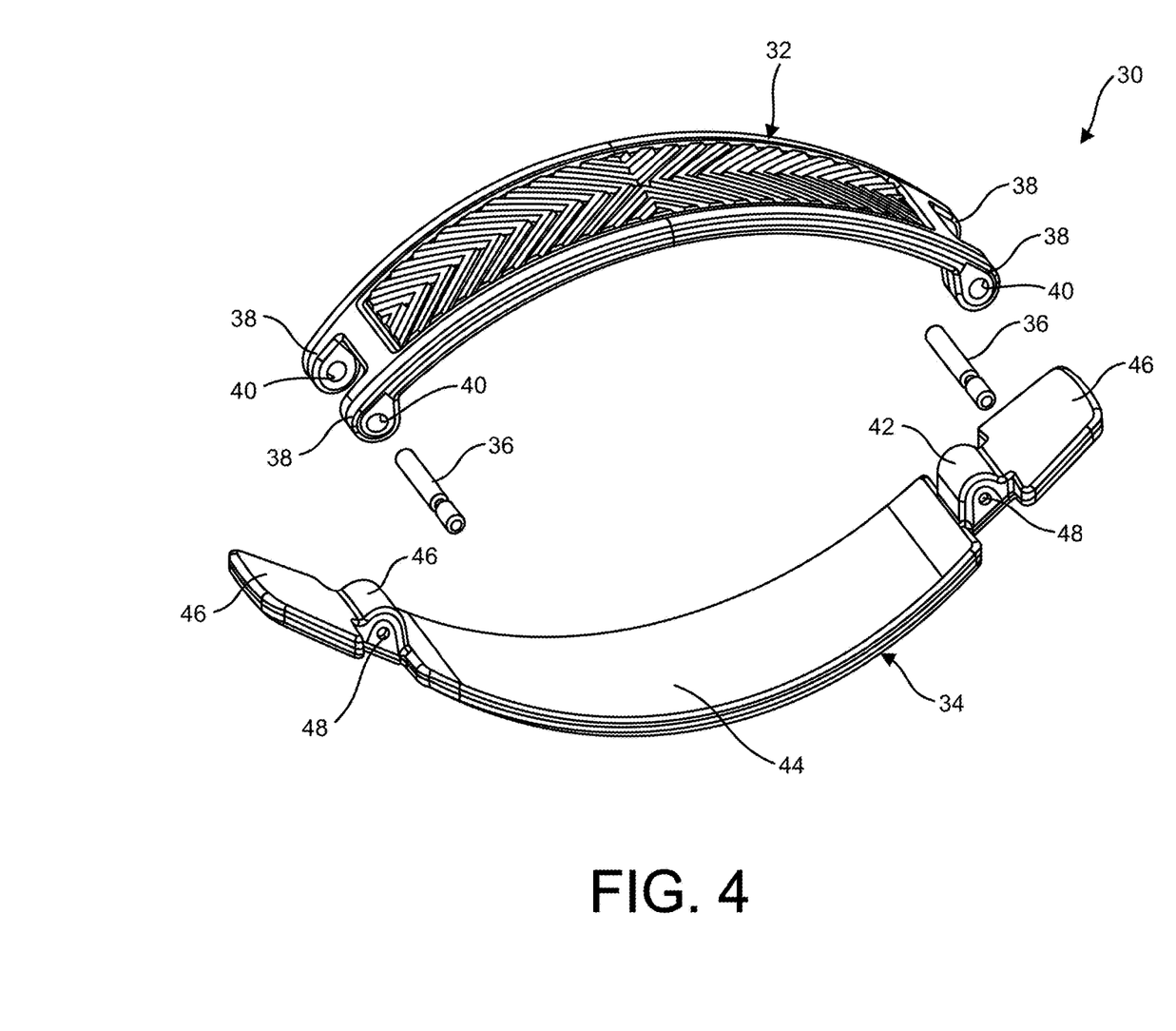
FIG. 4 is a separated view of the finger-hold.
Figure 5:
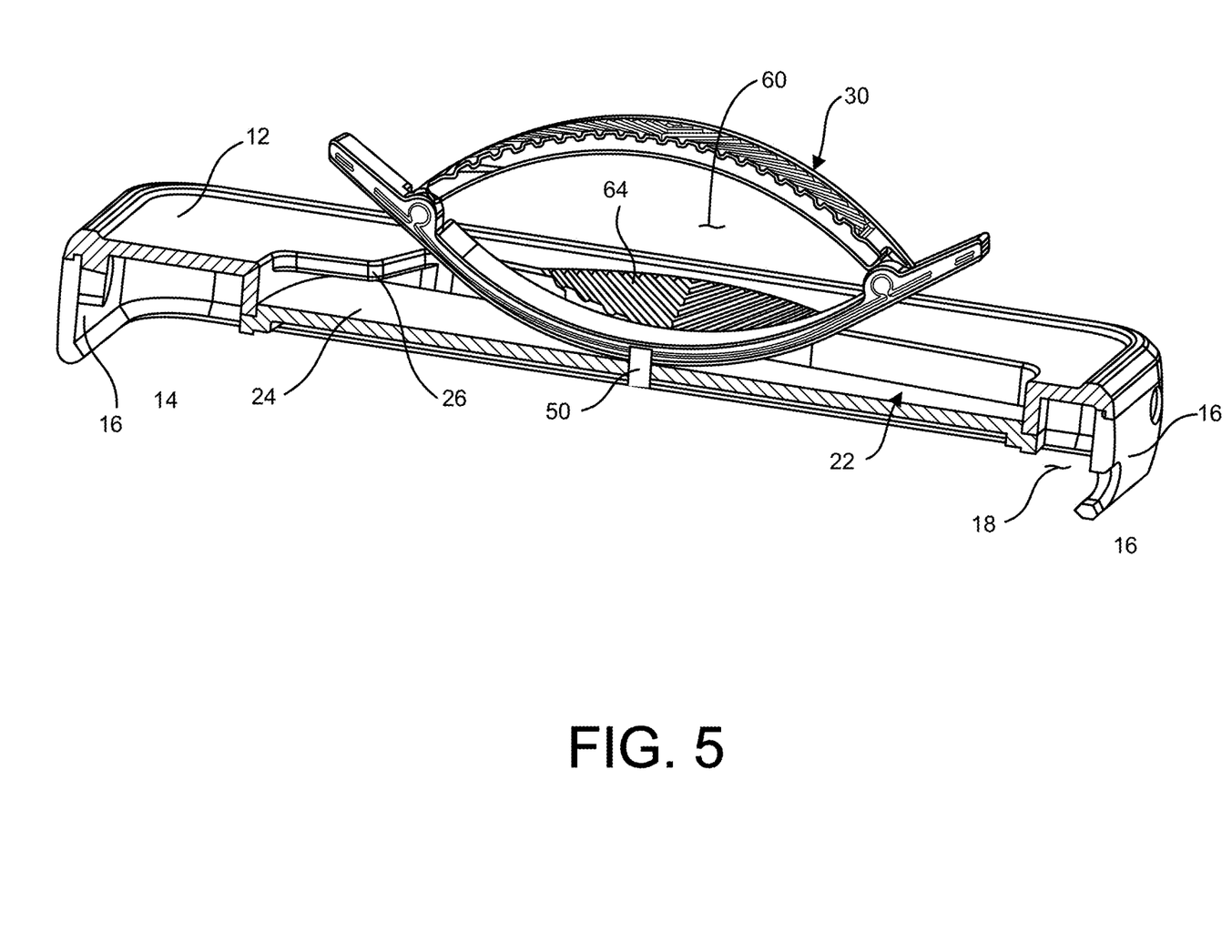
FIG. 5 is a section of the phone case of FIG. 1.

Referring to FIGS. 1-7, in one embodiment the phone case 10 includes a recessed portion 22. The recessed portion 22 is recessed from the remainder of the back. As such, a base 24 of the recessed portion is positioned below or forward (i.e., in a direction toward the inner surface 14) from a remainder of the outer surface 12 of the back. In one embodiment, the recessed portion 22 can be a portion of the case that is cut away. Alternatively, the recessed portion 22 can comprise a separate insert that is positioned against an opening cut in the phone case. Other configurations of the recessed portion are within the scope of the present invention. As seen in FIGS. 3 and 5, the recessed portion 22 includes a base surface 24. The outer surface 12 of the back includes an overhang 26 that at least partially overhangs some portion of the base surface 24 of the recessed portion 22. In the illustrated embodiment, the case 10 includes two overhangs 26 at diagonally opposed positions of the recessed portion 22. The overhangs 26 are sized, positioned, and configured to engage a finger-hold of the phone case, as described in more detail below.

Referring to FIGS. 1-7, the phone case 10 includes a finger-hold 30 positioned on the back of the phone case 10. The finger-hold 30 is movable between a collapsed position (see, e.g., FIG. 7) and an extended position (see, e.g., FIGS. 1, 3, 5, 6). In the extended position, the finger-hold 30 can be grasped by a user for secure gripping of the phone case 10 (and the phone received therein), as described in more detail below.

Referring to FIG. 4, the finger-hold 30 includes a bottom member 32 and a top member 34. In the embodiment illustrated in FIGS. 1-7, the top and bottom members 34, 32 are generally curved when the finger-hold 30 is in the extended position. Other configurations are within the scope of the present invention, such as planar, angled, or multi-component top and bottom members. The bottom and top members 32, 34 are movably (e.g., pivotally) attached to each other. As illustrated, in one embodiment the top and bottom members 34, 32 are pivotally attached by pins 36. The top member 34 includes a spaced pair of ears 38 at each end thereof, each of the ears including an opening 40. The bottom member 32 includes a neck 42 near each end, separating a central portion 44 of the bottom member from tabs 46 at each end of the bottom member. The necks 42 of the bottom member 32 each include an opening 48. When the finger-hold 30 is assembled such that the top and bottom members 34, 32 are pivotally attached, the neck 42 on a first end of the bottom member 32 is positioned between the pair of ears 38 on a first end of the top member 32, and the neck 42 on a second end of the bottom member is positioned between the pair of ears 38 on a second end of the top member. The top member 34 is pivotally attached to each end of the bottom member 32 by a pin 36 extending through the neck 42 of the bottom member and the pair of ears 38 of the top member at each respective end. Other configurations are within the scope of the present invention. For example, the top member can include necks that are positioned between pairs of ears on the bottom member. In other embodiments, any suitable pivot attachment between members can be used.

The finger-hold 30 is movably attached to the phone case 10. In the illustrated embodiment, the finger-hold 30 is attached to the phone case 10 so as to permit free rotational movement in either direction (i.e., counterclockwise and clockwise). In an illustrated embodiment, the finger-hold is attached to the recessed portion 22 of the case 10, such as to the base 24 of the recessed portion. For example, as illustrated, fastener 50 attaches the back of the phone case 10 to the bottom member 32 of the finger-hold 30. Fastener 50 can be any suitable fastener configured to permit free rotation of the finger-hold 30 relative to the phone case 10. In one embodiment, fastener 50 comprises a rivet. In one embodiment, as illustrated, the fastener 50 does not extend completely through the bottom member 32 of the finger-hold 30; in other words, in one embodiment the fastener is not visible and a user does not contact the fastener 50 when using the finger-hold 30. Optionally, a retaining ring 52 may be positioned on fastener 50 against the front 16 of the phone case 10. It is understood that any attachment permitting rotation of the finger-hold 30 relative to the phone case 10 is within the scope of the present invention. Although free rotation of the finger-hold when it is in the extended position is shown and described, other configurations are within the scope of the present invention, such as a limited arc of movement for the finger-hold, or other suitable attachments.

Figure 6:
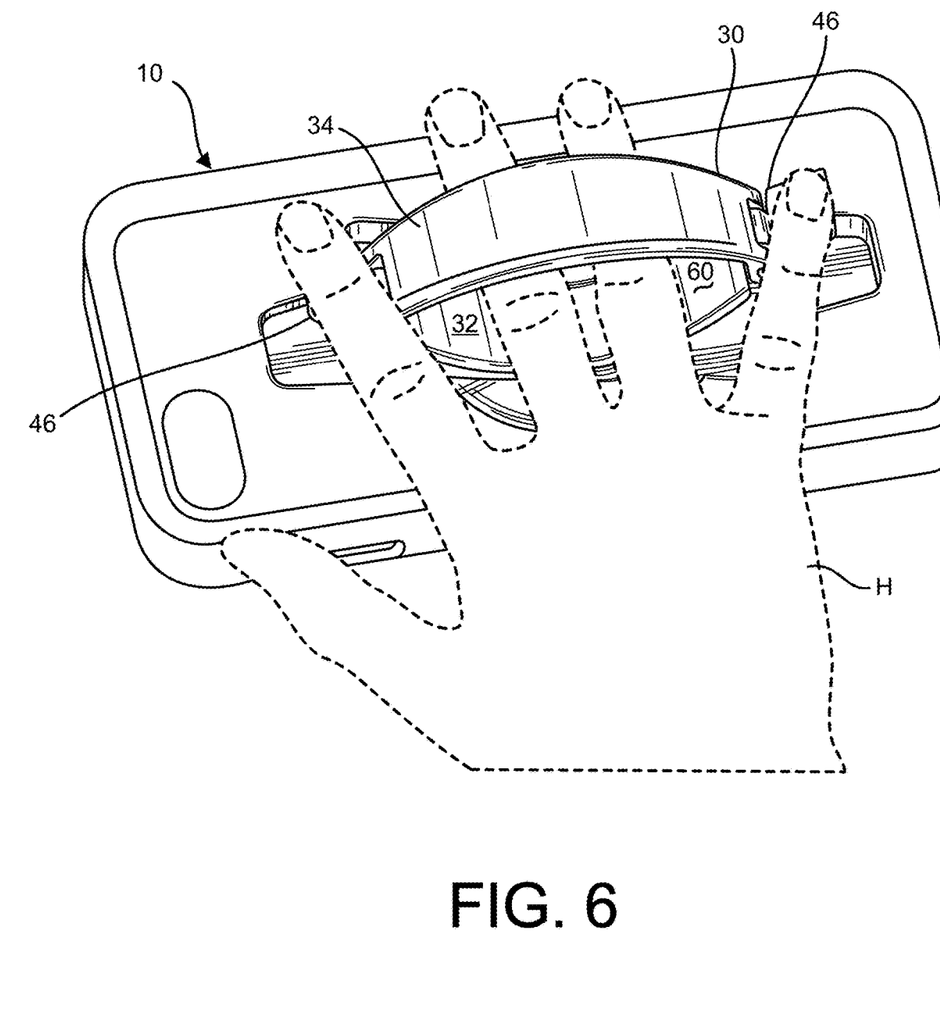
FIG. 6 is a perspective view of the phone case of FIG. 1, illustrating a user's hand using the finger-hold.
Figure 7:
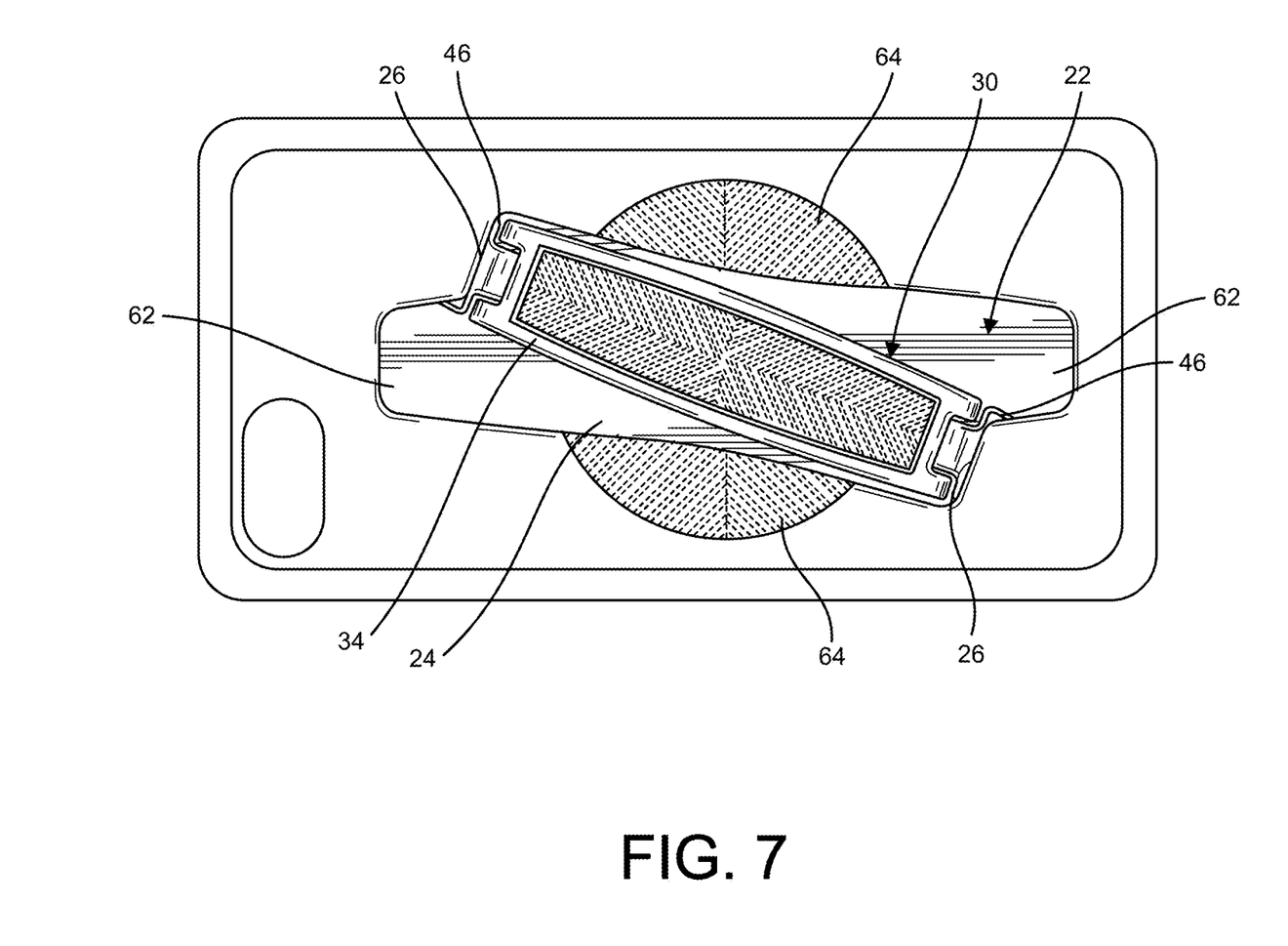
FIG. 7 is a top plan of the phone case, illustrating the finger-hold in a collapsed position.

The finger-hold 30 is movable between an extended position and a collapsed position. In the extended position (see, e.g., FIG. 6), an opening 60 is defined between the bottom member 32 and the top member 34 of the finger-hold 30. In the collapsed configuration (see, e.g., FIG. 7), the top member 34 lies substantially flat against the bottom member 32. Thus, in the extended position, the finger-hold is configured to be grasped by a user to securely hold the phone case and phone. For example, as seen in FIG. 6, a user may insert one or more fingers through the opening 60 to securely attach the phone to the user's hand H. A user may also rest one or more fingers on one or both of the tabs 46 of the bottom member 32, to provide a secure and comfortable hold. As described above, the finger-hold can be attached to the phone case 10 to permit free rotation relative thereto. Thus, a user can position the finger-hold 30 in any desired orientation relative to phone case 10 for secure holding based on comfort, orientation of phone screen during use, or any other factor. Use of the finger-hold 30 permits secure holding of the phone and phone case while leaving the user's thumb free for use of the phone. In the collapsed position, the finger-hold is configured to lie substantially flat against the back 12 of the phone case 10, so as to be out of the way of the user or to reduce the footprint of the phone case for storage (e.g., carrying in a pocket, placing on a surface, etc.).

The finger-hold 30 is preferably biased to the extended position. Thus, absent external forces acting on the finger-hold 30, the finger-hold is in the extended position for grasping by a user. The finger-hold may include spring steel, shape memory alloy, or any other suitable material or configuration to permit biasing to the extended position. In order to overcome the bias and collapse the finger-hold, the tabs 46 of the bottom portion 32 are rotated to a position underneath the overhangs 26. Each tab 46 is thus positioned between the base 24 of the recessed portion 22 and the respective overhang 26. Each tab 46 may contact an underside of the respective overhang 26. The overhang thereby prevents the finger-hold 30 from returning to the extended position, and maintains the finger-hold in the collapsed position. In order to move the finger-hold to the collapsed position, in one embodiment the finger-hold can be pressed down (e.g., by pressing down on the top member 34 to flatten the finger-hold). In the illustrated embodiment, the recessed portion 22 includes tab or tab-receiving portions 62. The tab portions 62 have sufficient length and dimensions to receive the tabs 46 of the finger-hold bottom portion 32 when the finger-hold is in the collapsed (or flattened) position. To* collapse the finger-hold, the finger-hold 30 is pressed down to flatten it when the tabs 46 are aligned with the tab portions 62 of the recessed portion 22. Once the finger-hold 30 is sufficiently flattened to fit underneath the overhangs 26, the finger-hold is rotated to move the tabs 46 under the respective overhangs 26. The overhangs 26 thereby contact the tabs 46 to prevent the finger-hold from returning to the extended position, maintaining the finger-hold in the collapsed position. In order to move the finger-hold 30 from the collapsed position back to the extended position, the finger-hold is rotated to remove the tabs 46 from under the overhangs 26. With nothing to counteract the bias and force the finger-hold to remain collapsed, the finger-hold will return to the extended position.

As illustrated, the phone case 10 may optionally include additional features to facilitate easy use and gripping by a user. For example, the case 10 may include a depression 64 partially surrounding the recessed portion 22. The depression 64 can be conical, spherical, or have any other suitable shape. The depression 64 can include ribs to provide additional gripping surfaces for the user. In addition, one or both of the top and bottom members 34, 32 of the finger-hold can include ribbed gripping surfaces (see, e.g., FIG. 4). The finger-hold 30 can be coated in rubber or other plastic material for easy gripping. It is understood that other ribbed portions or designs, and other gripping surfaces, are within the scope of the present invention, and that the phone case need not include any additional features to facilitate easy gripping (see, e.g., FIG. 8, with no depression).

Figure 8:
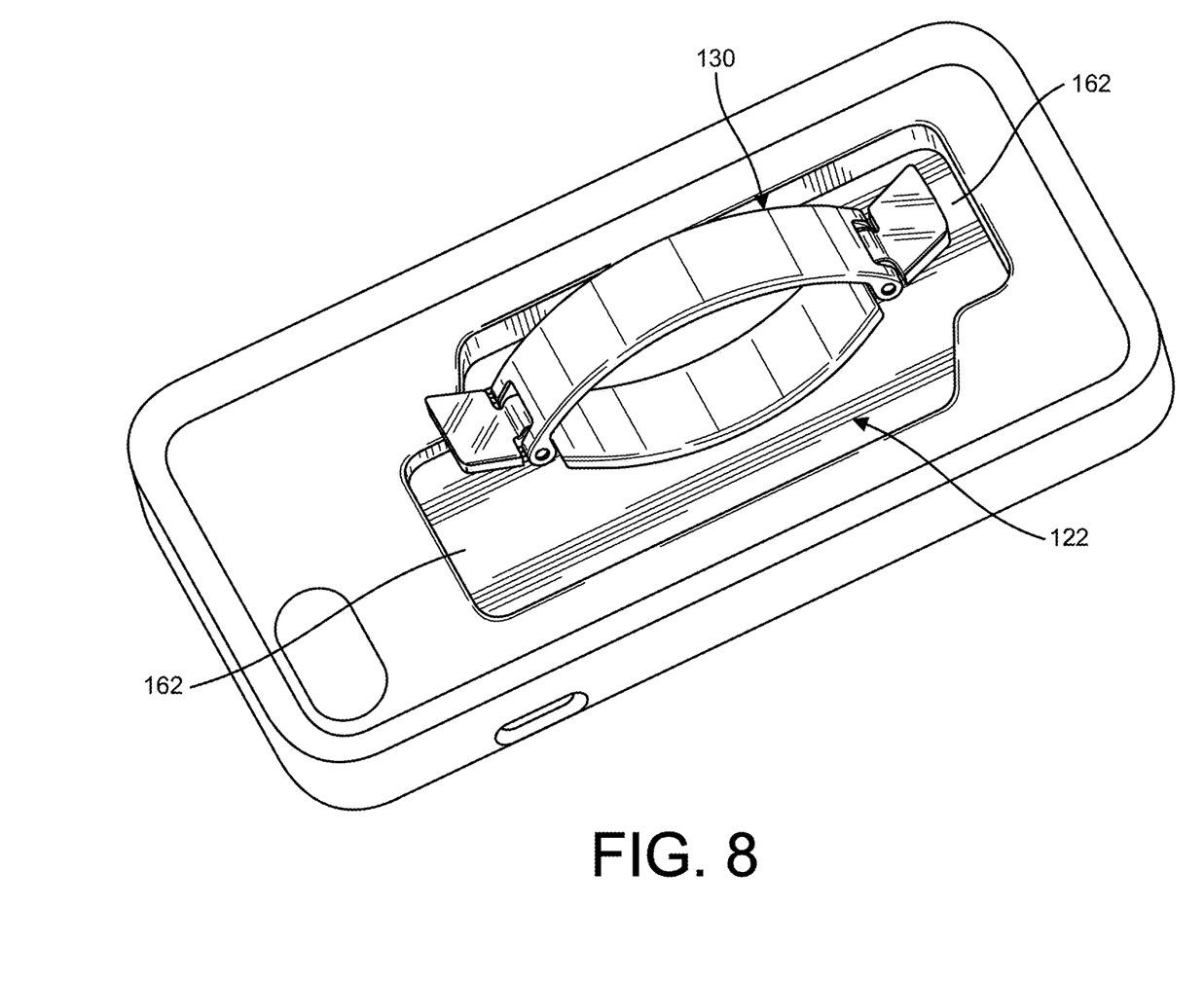
FIG. 8 is a perspective view of a second embodiment of a phone case, illustrating a finger-hold in an extended position.
Figure 9:
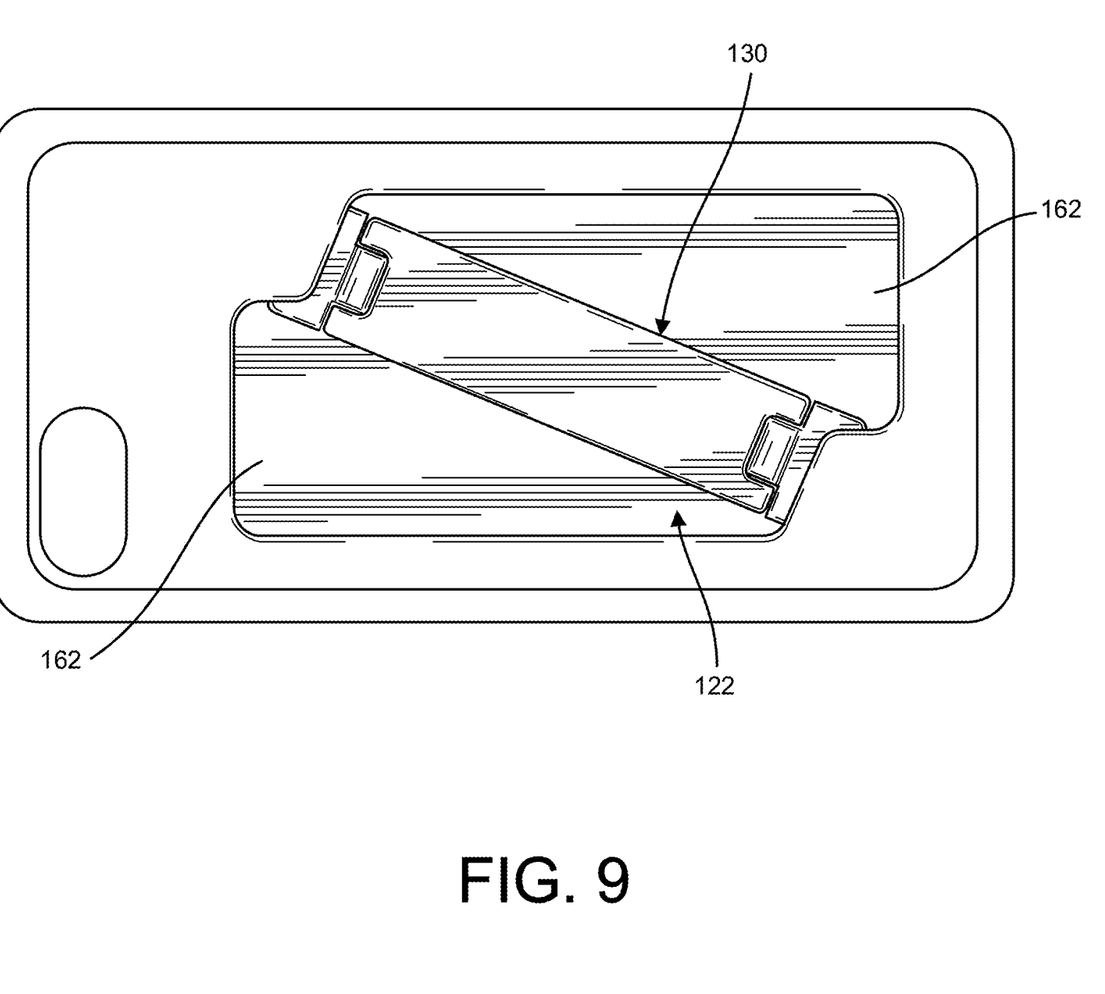
FIG. 9 is a top plan thereof, illustrating the finger-hold in a collapsed position.
Figure 10:
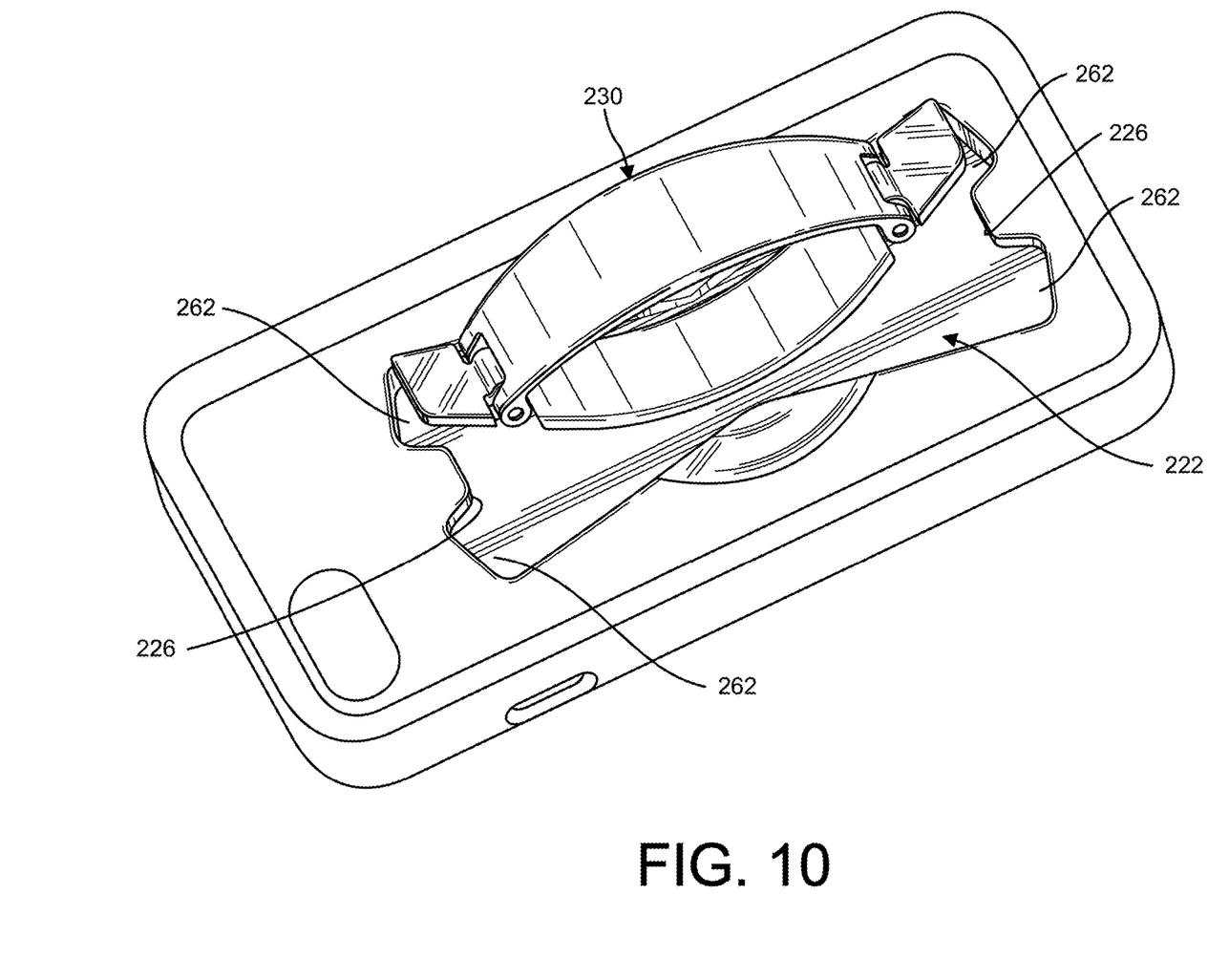
FIG. 10 is a perspective view of a third embodiment of a phone case, illustrating a finger-hold in an extended position.
Figure 11:
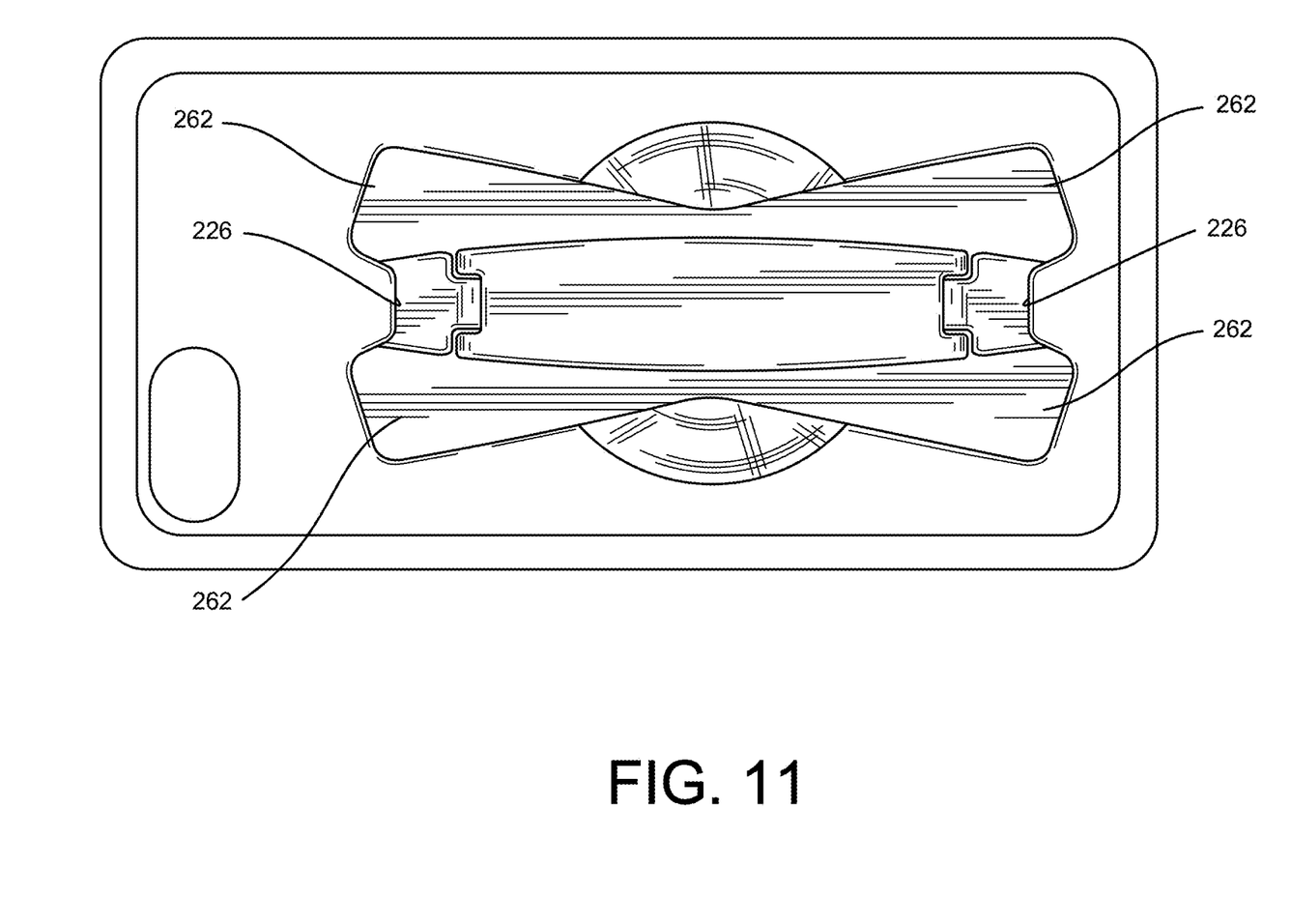
FIG. 11 is a top plan thereof, illustrating the finger-hold in a collapsed position.

FIGS. 8-11 illustrate alternative configurations for the phone case 10. Unless otherwise stated, the description above with reference to FIGS. 8-11 (and corresponding reference numerals) applies, except where differences are indicated. In FIGS. 8 and 9, the tab portions 162 of the recessed portion 122 are larger, thereby giving a user a larger area in which the finger-hold 130 can be pressed down for rotation to the secured collapsed position. In FIGS. 10 and 11, the recessed portion 222 includes four tab portions 262, with a central overhang 226 positioned between the tab portions on each end. Other configurations and embodiments are within the scope of the present invention.

The phone case as shown and described permits a user to securely attach a phone to the user's hand. Furthermore, the phone case allows a user to orient the phone and the finger-hold in any orientation for comfort and ease of use, while maintaining the thumbs free for use of the phone. Thus, for example, a user can use the finger-hold to secure the phone while taking a selfie, without worrying about dropping the phone. Moreover, the finger-hold collapses flat against the back of the phone case for convenience and a small footprint when the finger- hold is not in use. In addition, the finger-hold is part of the phone case 10, so the user need not worry about adhesives coming loose, as with other phone grips that are attached to phone cases aftermarket.

It will be understood that various features of the aspects of the apparatus and methods described herein may be used in combination with, or instead of, particular features of another aspect. Having provided the disclosure in detail, it will be apparent that modifications and variations are possible without departing the scope of the disclosure defined in the appended claims. Furthermore, it should be appreciated that all examples in the present disclosure are provided as non-limiting examples.

What is claimed is:

1. A phone case with a finger-hold, comprising:
    a back portion including a recessed portion and at least one overhang,
    wherein the finger-hold is received in the recessed portion and has a top member and a bottom member having tabs at each end thereof, the finger-hold being rotatable between an extended position in which an opening is defined between the top member and the bottom member for use in gripping the phone case and a collapsed position in which the top member is substantially flat against the bottom member, the finger-hold being biased to the extended position,
    wherein in the collapsed position, at least one tab of the bottom member is positioned underneath the at least one overhang, and in the extended position, the finger-hold is rotated such that the at least one tab of the bottom member is free from the at least one overhang.

2. The phone case as recited in claim 1, wherein the finger-hold is rotatably attached to the recessed portion.

3. The phone case as recited in claim 2, wherein the finger-hold is freely rotatable relative to the recessed portion.

4. The phone case as recited in claim 1, wherein the top member of the finger-hold is pivotally attached to the bottom member of the finger-hold.

5. The phone case as recited in claim 1, comprising two overhangs at diagonally opposite locations.

6. The phone case as recited in claim 1, wherein the back portion includes two overhangs, each overhang being centered between tab-receiving portions of the recessed portion.

7. The phone case as recited in claim 1, wherein the finger-hold is configured to be positioned such that the tabs of the bottom member are between a base of the recessed portion and the at least one overhang, thereby maintaining the finger-hold in the collapsed position.

8. The phone case as recited in claim 1, wherein the finger-hold comprises a ribbed gripping surface.

9. The phone case as recited in claim 1, wherein the back portion includes a ribbed depression for gripping.

10. The phone case as recited in claim 1, wherein the finger-hold is rotatably attached to a base of the recessed portion such that the finger-hold is freely rotatable relative to the base of the recessed portion when the finger-hold is in the extended position.

11. The phone case as recited in claim 1, wherein the top member of the finger-hold is pivotally attached to the bottom member of the finger-hold.

12. The phone case as recited in claim 11, wherein the bottom member of the finger-hold comprises a central portion, a first tab at a first end of the bottom member, a first neck between the central portion and the first tab, a second tab at a second end of the bottom member, and a second neck between the central portion and the second tab.

13. The phone case as recited in claim 12, wherein the top member comprises a first pair of ears at a first end thereof and a second pair of ears at a second end thereof, wherein the top member is pivotally attached to the bottom member by a first pin extending through the first pair of ears and the first neck and a second pin extending through the second pair of ears and the second neck.

14. A method comprising:
providing a phone case with a finger-hold, comprising:
a back portion including a recessed portion and at least one overhang, and
wherein the finger-hold is received in the recessed portion and has a top member and a bottom member having tabs at each end thereof, the finger-hold being rotatable between an extended position in which an opening is defined between the top member and the bottom member for use in gripping the phone case and a collapsed position in which the top member is substantially flat against the bottom member, the finger-hold being biased to the extended position;
collapsing the finger-hold from the extended position to the collapsed position by pressing the top member substantially flat against the bottom member and rotating the finger-hold until at least one tab of the bottom member is positioned underneath the at least one overhang; and
extending the finger-hold from the collapsed position to the extended position by rotating the finger-hold until the at least one tab of the bottom member is free from the at least one overhang.

\* \* \* \* \*